June 6, 1950    F. M. GREENE    2,510,311
HEDGE TRIMMER ATTACHMENT
Filed Oct. 30, 1947

Frank M. Greene
INVENTOR.

BY
ATTORNEY

Patented June 6, 1950

2,510,311

UNITED STATES PATENT OFFICE 2,510,311

HEDGE TRIMMER ATTACHMENT

Frank M. Greene, Oklahoma City, Okla.

Application October 30, 1947, Serial No. 783,156

1 Claim. (Cl. 30—132)

My invention relates to hedge clippers, and more particularly to a device for catching clippings cut off by a hedge clipper.

The prime object of the invention is to provide a clipping catcher of simple and light construction, which may be readily attached to any commercially made hedge clipper.

Another object is to provide a catcher that will receive the clippings as they fall behind the clipping blade so as to prevent them falling down on the unclipped portion of the hedge.

A further object is to provide a catcher that may be easily emptied of clippings.

A still further object is to provide a catcher of this class which is comparatively cheap to manufacture, and can therefore be sold at a consumer price which is not prohibitive.

Other objects will be apparent from the following description, when taken in conjunction with the accompanying single sheet of drawing, wherein.

Like characters of reference designate like parts in all figures of the drawing wherein they occur.

In the drawing.

Figure 1:
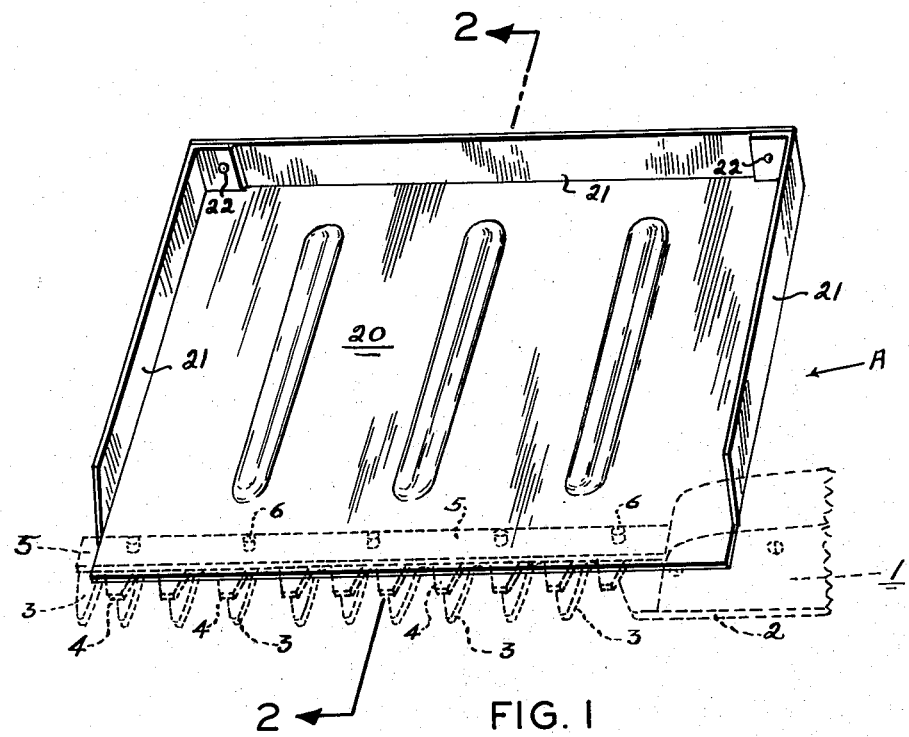
Figure 1 is a perspective view of the device, illustrating in dotted lines, a portion of the operating head and the cutting blade of a conventional electrically operated hedge clipper.

The reference numeral 1 indicates a portion of the operating head of an electrically operated hedge clipper, having a bottom plate 2 which extends longitudinally outward from the operating head, and formed along one edge to provide a series of pointed fingers or guards 3. The clipper further includes a sickle or cutting blade 4 which is driven to a reciprocating motion. The blade 4 slides along the upper side of the guards 3, and under a guide plate 5. The blade 4 by its reciprocal action, cuts off those portions of the hedge which are held between the guards 3. Several bolts 6, and nuts 7 for each, hold the guard and guide in position to permit operation of the blade 4 therebetween. The blade 4 is slotted longitudinally around the bolts 6 so as to permit the reciprocating action of the blade.

Figure 2:
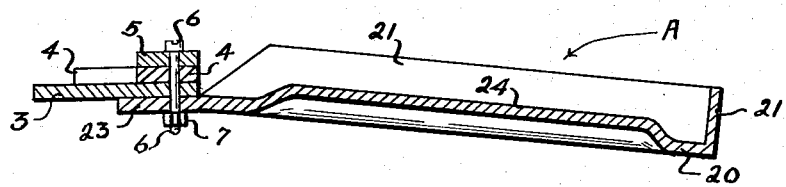
Figure 2 is a vertical sectional view taken substantially along the line 2—2 of Fig. 1.

The reference numeral 20 indicates the floor or bottom of a tray A, preferably constructed of sheet aluminum or any light weight rigid material. Three edges of the bottom 20 are provided with upstanding integral marginal flanges or sides 21. Bolts 22 act to hold the flanges or sides 21 together at the corners of the tray, the flanges being any desired height so as to form a tray of the desired depth, with the side next to the blade 4 being open. That edge portion of the tray bottom 20 which extends along the open side of the back or trailing edge of the guard 3, bolts 6 and nuts 7 for each being used as the attaching means. This edge portion may well be termed a lip, and is indicated by the reference numeral 23. The catcher or tray is bent slightly downward from a horizontal position, preferably at an angle of approximately six degrees, as best shown in Fig. 2, the bend extending across the entire open side of the catcher, and lying just behind the guard. The floor 20 is made rigid by stiffeners 24 formed into the material, the number needed being determined by the size of the catcher.

Figure 1 illustrates the catcher in operating position, ready to receive clippings as they fall behind the clipping guard, as the guard is moved along a hedge row. Figure 2 illustrates the angle at which the catcher is attached to the blade guard, and details the assembled arrangement of the tray edge 23, the guard 3, the cutting blade 4, and the guide 5. As stated above the cutting blade 4 is provided with longitudinally extending slots through one of which each of the bolts 6 extends. These slots permit longitudinal reciprocation of the blade without hindrance from the bolts.

It is thought that operation of the device may be clearly understood from the above description, without further elaboration.

Obviously the invention is susceptible to some change or alteration without defeating its practicability, and I therefore do not wish to be confined to the preferred embodiment shown in the drawing and described herein, further than I am limited by the scope of the appended claim.

I claim:

The combination with the clipper having a longitudinally reciprocating toothed cutter blade, a cooperating stationary toothed blade, and having a rigidly positioned elongated bar element lying parallel to and in contact with the said reciprocating blade of: a tray having a substantially flat rectangular bottom; perpendicular marginal walls along three edges of said bottom; and outwardly projecting lip extending along the fourth edge portion of said bottom, and attached to said clipper in contact with said stationary blade by means passing through said elongated bar element, the reciprocating blade, the stationary blade and said lip whereby the two cutting blades are positioned between said lip and said bar element.

FRANK M. GREENE.

REFERENCES CITED

The following references are of record in the file of this patent:

UNITED STATES PATENTS

| Number | Name | Date |
| --- | --- | --- |
| 1,665,032 | Holland | Apr. 3, 1928 |
| 2,281,189 | Wright | Apr. 28, 1942 |
| 2,325,734 | Bishop | Aug. 3, 1943 |